(12) United States Patent
Kent

(10) Patent No.: US 8,403,243 B2
(45) Date of Patent: Mar. 26, 2013

(54) V-BLADE GRATER

(75) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 275 days.

(21) Appl. No.: 12/898,573

(22) Filed: Oct. 5, 2010

(65) Prior Publication Data

US 2012/0080547 A1   Apr. 5, 2012

(51) Int. Cl.
*A47J 43/25* (2006.01)

(52) U.S. Cl. .................. 241/95; 241/168; 241/273.1

(58) Field of Classification Search ............. 241/95, 241/273.1–273.4, 168
See application file for complete search history.

(56) References Cited

U.S. PATENT DOCUMENTS

| | | | |
|---|---|---|---|
| 2,482,180 A | 9/1949 | Heard | |
| 2,505,114 A | 4/1950 | Hayman et al. | |
| 3,583,455 A | 6/1971 | Ostrowsky | |
| 3,610,304 A | 10/1971 | Popeil | |
| D227,534 S | 7/1973 | Hutzler | |
| D259,759 S | 7/1981 | Williams | |
| 5,100,506 A | 3/1992 | Sturtevant et al. | |
| D337,491 S | 7/1993 | So | |
| 6,135,375 A | 10/2000 | Kaposi et al. | |
| D438,433 S | 3/2001 | Kaposi et al. | |
| 6,409,107 B1 | 6/2002 | Romano | |
| 6,860,441 B2 | 3/2005 | Richardson | |
| 7,469,848 B2 | 12/2008 | Yamanaka et al. | |
| 2008/0190304 A1 | 8/2008 | Sawhney et al. | |
| 2010/0140212 A1 | 6/2010 | Li | |
| 2011/0017853 A1* | 1/2011 | Smith et al. | 241/95 |

FOREIGN PATENT DOCUMENTS

| | | |
|---|---|---|
| DE | 178171 | 9/1935 |
| GB | 2048023 | 10/1995 |
| GB | 2335841 | 10/1999 |
| GR | 871808 | 7/1987 |

* cited by examiner

*Primary Examiner* — Mark Rosenbaum
(74) *Attorney, Agent, or Firm* — Lowe Graham Jones PLLC

(57) ABSTRACT

A food grater having an improved cutting surface with teeth that are configured to prevent or reduce the sideways pull against a food item as it travels along the cutting surface. In a preferred version, the blades are formed with a V-shape that improves the ability of the user to push a food item straight down the cutting surface.

12 Claims, 4 Drawing Sheets

V-BLADE GRATER

FIELD OF THE INVENTION

This invention relates generally to food graters.

BACKGROUND OF THE INVENTION

There are many different food graters on the market. In most cases, such graters have a planar or curved cutting surface with a plurality of blades formed on the cutting surface. The blades extend outward from the surface in order to scrape away a portion of the food item. By including many blades in close proximity to one another, the food item can be shredded by dragging the food item over the cutting surface.

Unfortunately, with graters that are currently on the market the blades tend to pull the food item toward one side or the other rather than vertically straight down the cutting surface. This pull makes for a less efficient grating process as a part of the food item is pulled out of contact with the cutting surface. It also makes grating more work as the user must exert more force to work against this sideways pull.

SUMMARY OF THE INVENTION

The present invention comprises a food grater having an improved cutting surface having teeth that are configured to prevent or reduce the sideways pull against a food item as it travels along the cutting surface. In the preferred version as shown, the blades are formed with a V-shape that improves the ability of the user to push a food item straight down the cutting surface.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
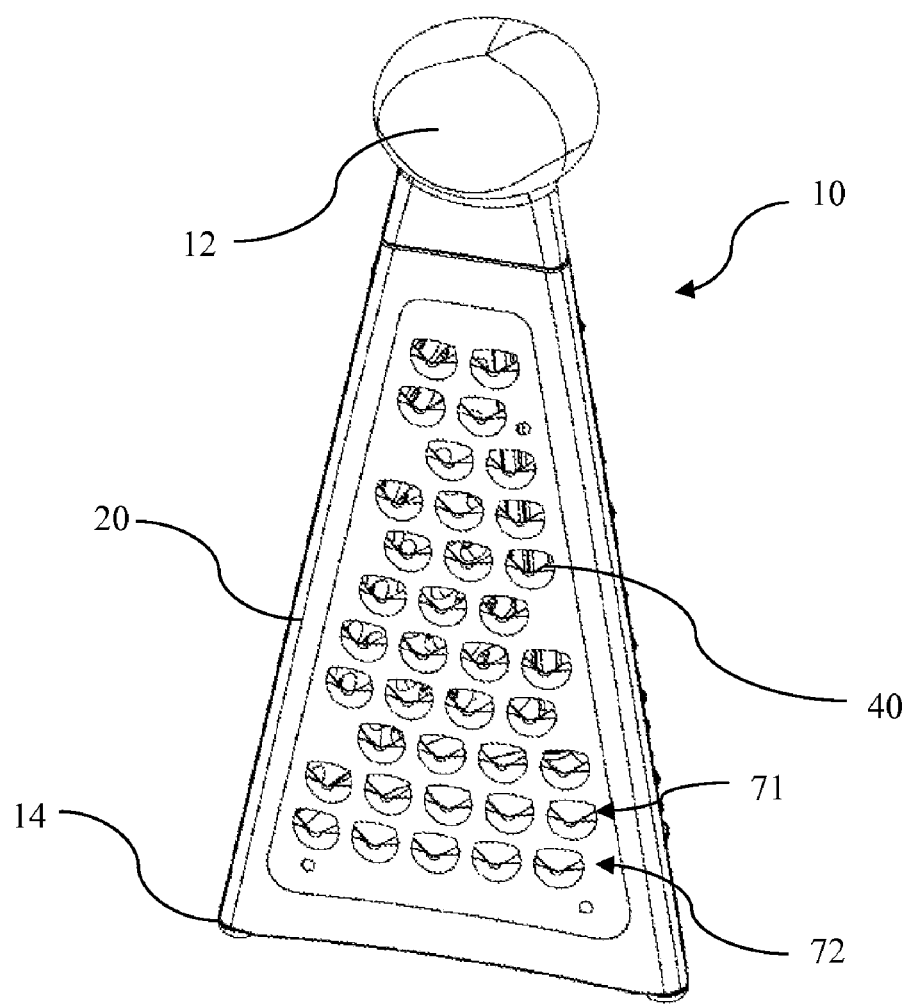
FIG. 1 is a perspective view of a preferred grater in accordance with the invention.

An exemplary food grater 10 is illustrated in FIG. 1 as having a grip or handle 12, a base 14, and one or more sidewalls 20 extending upwardly between the base and the handle. In one version, the sidewalls are inclined inwardly from the base to the handle to form a generally pyramidal shape having an interior space defined by the sidewalls. The sidewalls may optionally taper to form a triangular or trapezoidal shape at each side, as shown in the exemplary version. In addition, a grater in accordance with the present invention may have any number of sides. A preferred version of the pyramidal type includes three or four sidewalls 20.

Figure 2:
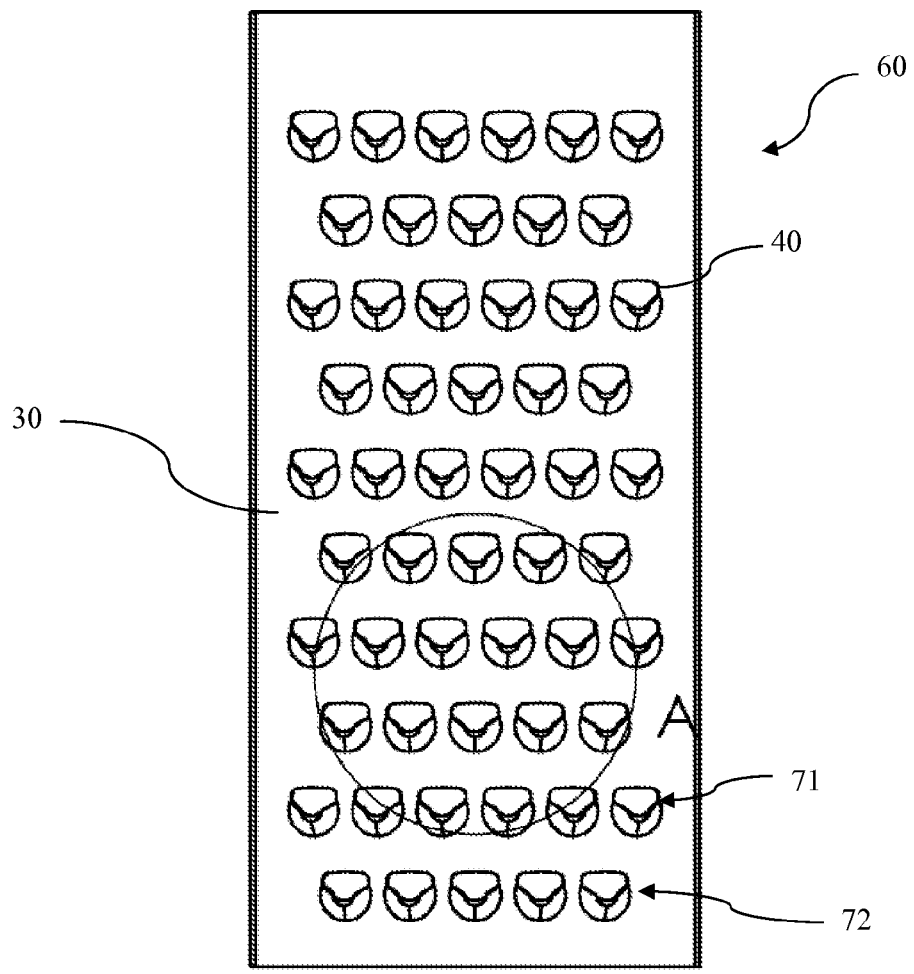
FIG. 2 is a front plan view of an alternate version of a preferred grater.

An alternate version of a food grater 60 as illustrated in FIG. 2 includes a single cutting surface 30 that is preferably supported by a metal wire frame (not shown) and includes a handle (not shown) to allow the user to grip the grater. This type of hand-held grater may have a planar cutting surface or, in the version as shown and as best seen in the top view of FIG. 3, may have a cutting surface 30 that is convex or bowed outwardly.

Each version of the grater includes a plurality of cutting surfaces or blades 40 that are arranged in a plurality of rows 71, 72. The base 14 of the grater 10 defines a plane such that a grater of the type shown in FIG. 1 may rest on a horizontal surface such as a countertop. In the exemplary version as shown, the rows 71, 72 of blades are substantially parallel to the plane defined by feet or the lowest surface of the base of the grater. In the hand-held version of the grater 60 there may not be a base. In such a version, the rows of the grater 71, 72 are formed such that the rows are substantially parallel to one another.

Figure 6:
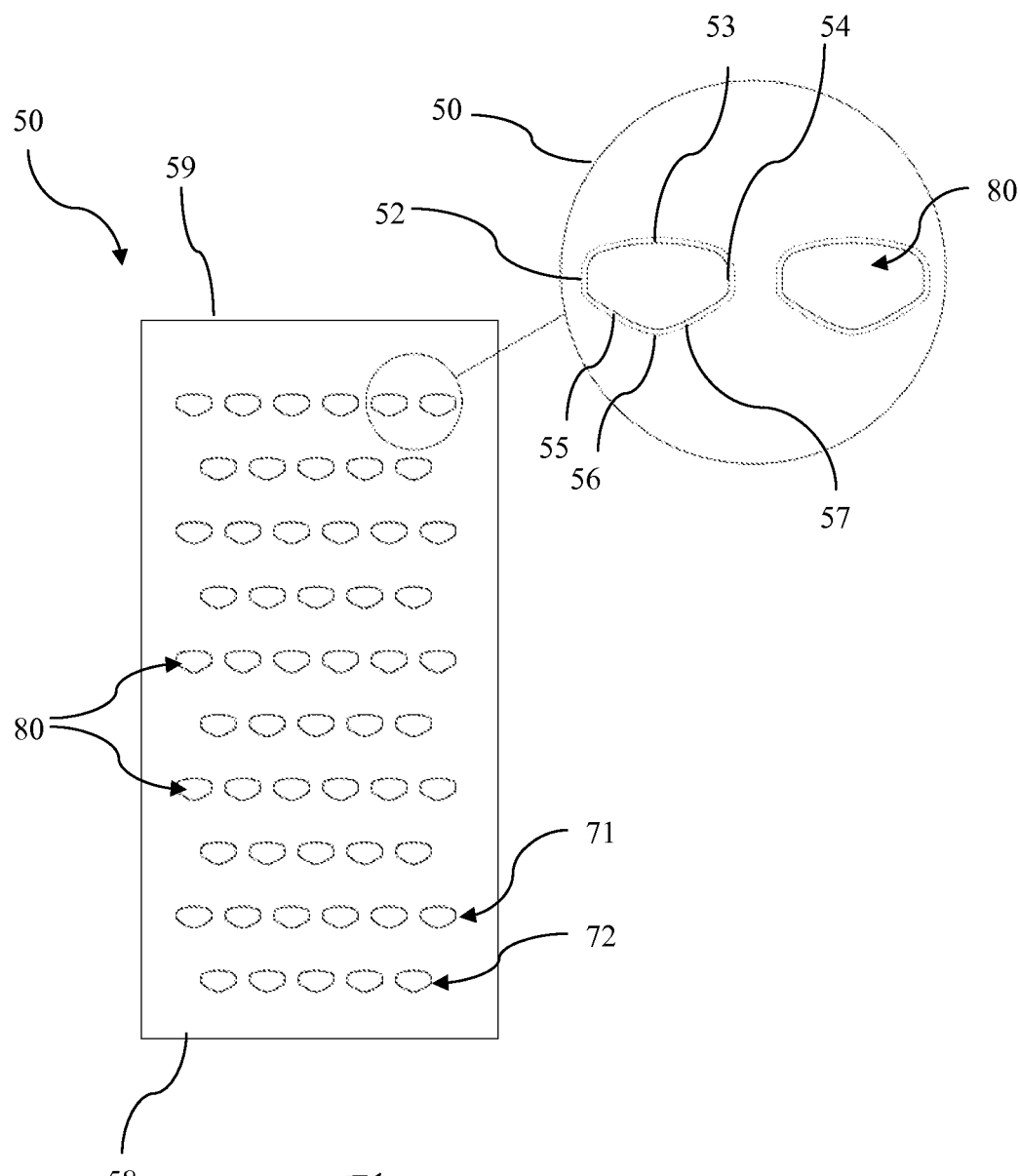
FIG. 6 is a front plan view including a detail view of a metal blank for forming a grating surface in accordance with the invention.

In accordance with a preferred method of manufacturing the cutting surface, the method begins with a metal blank 50 as shown in FIG. 6. The metal blank is planar in the initial step, and in the example as shown the blank 50 is substantially rectangular in shape. The blank may alternatively be formed as a triangle, trapezoid, or other shape as noted above.

The manufacturing process then forms a plurality of openings 80 in the blank 50 that define a plurality of rows, each of the plurality of rows having a plurality of openings. In one version of the invention, the openings are formed by a stamping process that punches chads from the metal blank, leaving the openings 80 that define the several rows, e.g., 71, 72. In an alternate version of the invention, the openings are formed by etching the metal blank by masking the blank other than in the areas forming the openings and then subjecting the blank to a solution that will etch away the metal in the region of the openings 80. The etching process is used in the preferred version in order to form a sharper cutting edge of the blade.

As shown in the detail portion of FIG. 6, the openings that are punched, etched, or otherwise formed in the blank are configured with a V-shape along the lower edge of the openings. The blank 50 includes proximal end 59 and a distal end 58, the proximal end being relatively adjacent the grip or the handle when the grater is formed. Accordingly, a food item being grated will be urged along a path of travel that runs from the proximal end toward the distal end of the grater. In this orientation, the lower edge of the openings 80 is the edge closer to the distal end while the upper e of the openings is the edge closer to the proximal end of the grater.

The preferred shape of the openings 80 is best seen in the detail view of FIG. 6. Thus, the lower edge of the opening is defined by a V-shape having a first upright 55 and a second upright 57 with an apex 56 defined by the intersection of the first and second uprights. The two uprights form a distinct V-shape which may have a sharp and defined angle or may alternatively have a somewhat rounded apex while still retaining a distinct V-shape. Each upright 55, 57 forms a linear edge as it extends angularly upward and outward from the apex 56.

The openings 80 further include side edges 52, 54 and an upper edge 53. As shown, the side edges 52, 53 extend substantially vertically and linearly along a direction substantially perpendicular to the lines defined by the rows 71, 72. The top edge as shown may form a gentle arc or may be otherwise rounded to accommodate the passage of shreds of food items through the openings.

Figure 3:
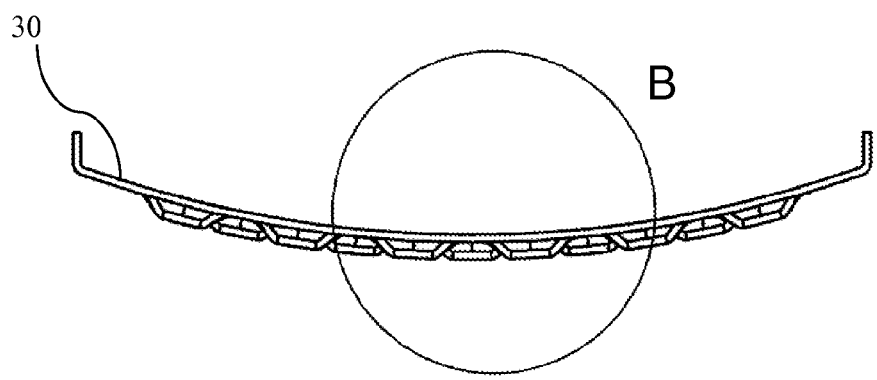
FIG. 3 is a top plan view of the grater of FIG. 2.
Figure 4:
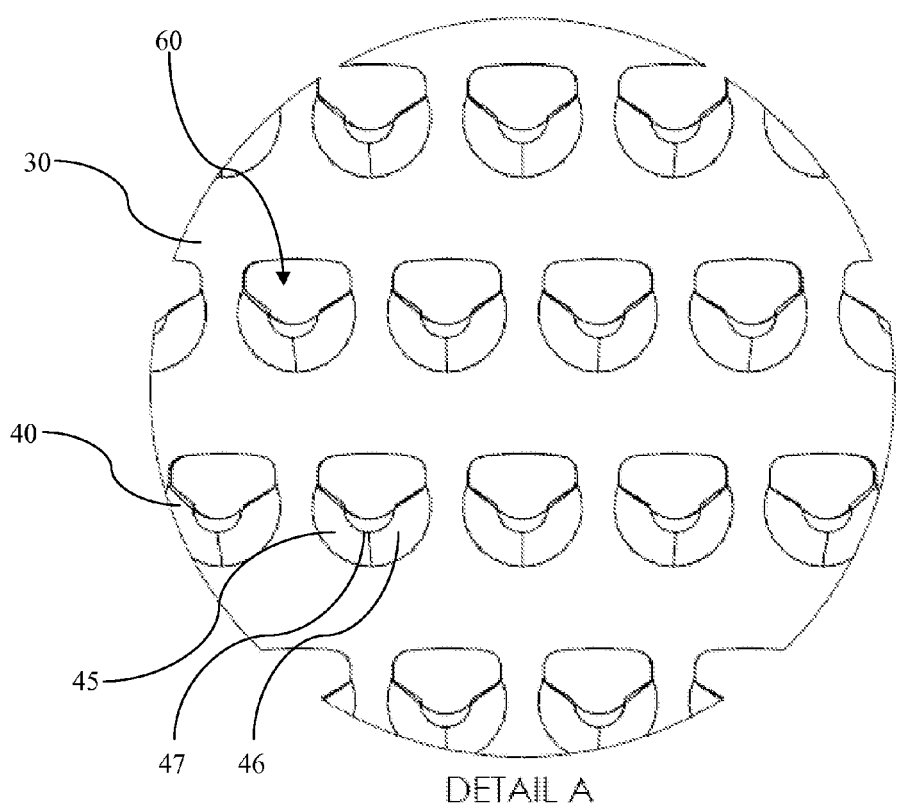
FIG. 4 is a front plan view of Detail A indicated in FIG. 2.
Figure 5:
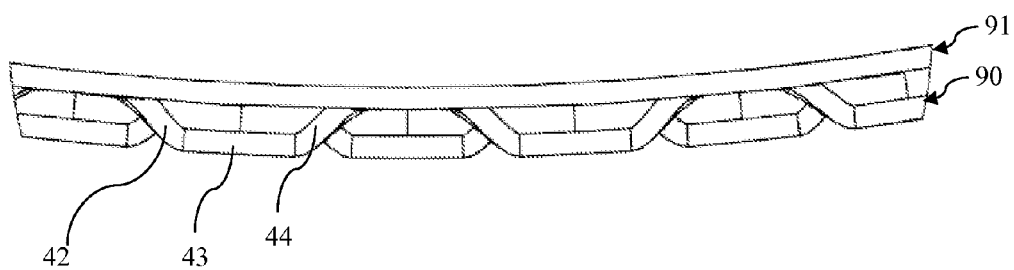
FIG. 5 is a top plan view of Detail B indicated in FIG. 3.

Once the openings are formed in the blank, the blank is stamped to form an outwardly extending blade along the lower edges of the openings. As best seen in FIG. 3, illustrating the front view of a preferred grater, and FIG. 5, illustrating the top view of a preferred grater, the preferred stamp pushes the lower edge of the blank along each opening outward to form a blade tooth. The blade tooth includes a first side 45, a second side 46, and a central portion 47. The lower edge of the opening when formed as a tooth comprises a first edge 42 formed at the edge of the first side 45, a second edge 44 formed at the edge of the second side 46, and a central edge 43 formed at the edge of the central portion 47. As best seen in the top view of FIG. 5, the preferred tooth includes defined angles formed at the intersection of the first edge 42 and the central edge 43, as well as at the intersection of the second edge 44 and the central edge 43.

As seen in FIG. 5, the central edges 43 of the teeth form an arc 90 that is substantially parallel to the arc 91 formed by the blank (or cutting surface after the blank is formed). Because the central portions 47 and central edges 43 are substantially linear, they extend through the arc for a substantial distance rather than being merely tangential to the arc as would be the case with a prior art grater.

In the case of a grater of the type shown in FIG. 1, the blank preferably is not formed into a convex shape in the stamping process. In such a version, the central edges 43 of the teeth form a line (rather than an arc) that is substantially parallel to a plane formed by the blank (or the plane of the cutting surface after the blank is formed). Because the central portions 47 and central edges 43 are substantially linear, they extend through the line for a substantial distance rather than being merely tangential to the line as would be the case with a prior art grater.

In use, the V-shape of the cutting blades or teeth cooperate to draw the food item straight downward from the proximal end of the grater toward the distal end of the grater, with less side-to-side pull than is experienced with prior art graters. The at least partially linear central edge further cooperates to urge the food item along a straight line. Consequently, a grater in accordance with the present invention allows for more efficient grating with less effort.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A grater, comprising:
   a cutting surface having a proximal end and a distal end;
   a plurality of blades formed on the cutting surface, the plurality of blades defining a plurality of rows, the plurality of rows being positioned between the proximal end and the distal end;
   at least a portion of the plurality of blades each having an upper edge and a lower edge defining an opening, the upper edge being relatively closer to the proximal end and the lower edge being relatively closer to the distal end, the lower edge further extending outward from the cutting surface to define a tooth, the lower edge forming a V-shape defined by a first upright, a second upright, and an apex positioned at an intersection of the first upright and the second upright, each of the first upright and the second upright extending angularly and upwardly from the apex in a direction from the distal end toward the proximal end, each of the first upright and the second upright further being substantially linear; and
   the portion of the plurality of blades each further comprising a first side edge extending between the upper edge and the lower edge, and an opposing second side edge extending between the upper edge and the lower edge.

2. The grater of claim 1, wherein each of the first side edge and the second side edge is substantially linear.

3. A grater, comprising:
   a cutting surface having a proximal end and a distal end;
   a plurality of blades formed on the cutting surface, the plurality of blades defining a plurality of rows, the plurality of rows being positioned between the proximal end and the distal end;
   at least a portion of the plurality of blades each having an upper edge and a lower edge defining an opening, the upper edge being relatively closer to the proximal end and the lower edge being relatively closer to the distal end, the lower edge further extending outward from the cutting surface to define a tooth, the lower edge forming a V-shape defined by a first upright, a second upright, and an apex positioned at an intersection of the first upright and the second upright, each of the first upright and the second upright extending angularly and upwardly from the apex in a direction from the distal end toward the proximal end, each of the first upright and the second upright further being substantially linear; and
   the lower edge further comprising a first edge, a second edge, and a central edge positioned between the first edge and the second edge, the central edge being substantially parallel to the cutting surface.

4. The grater of claim 3, wherein the cutting surface is substantially planar and the first edge is linear along a line that is parallel to the plane of the cutting surface.

5. The grater of claim 3, wherein the cutting surface forms a first arc and the first edge forms a second arc that is substantially parallel to the first arc.

6. The grater of claim 3, wherein each of the plurality of blades is substantially identical.

7. The grater of claim 6, further comprising a handle extending away from the proximal end of the cutting surface.

8. The grater of claim 3, further comprising:
   one or more additional cutting surfaces attached to the cutting surface to form an interior space; and
   a handle secured to the proximal end of the cutting surface and the one or more additional cutting surfaces.

9. The grater of claim 8, wherein the cutting surface and the one or more additional cutting surfaces define a base, the cutting surface and the one or more additional cutting surfaces being inclined upwardly and inwardly from the base toward the handle.

10. The grater of claim 3, wherein the cutting surface is produced by the method of:
    forming the plurality of openings in a metal blank; and
    stamping the metal blanks to form the plurality of teeth.

11. The grater of claim 10, wherein the step of forming the plurality of openings comprises etching the metal blank.

12. The grater of claim 10, wherein the step of forming the plurality of openings comprises stamping the metal blank.

\* \* \* \* \*